United States Patent
Lee et al.

(10) Patent No.: US 8,313,678 B2
(45) Date of Patent: Nov. 20, 2012

(54) PREPARING METHOD OF MICROPOROUS HIGH DENSITY POLYETHYLENE FILM

(75) Inventors: Young-Keun Lee, Daejeon (KR); Jang-Weon Rhee, Daejeon (KR); Jung-Moon Sung, Seoul (KR); Byoung-Cheon Jo, Daejeon (KR)

(73) Assignee: SK Innovation Co., Ltd. (KR)

( * ) Notice: Subject to any disclaimer, the term of this patent is extended or adjusted under 35 U.S.C. 154(b) by 1130 days.

(21) Appl. No.: 11/752,956

(22) Filed: May 24, 2007

(65) Prior Publication Data

US 2007/0218271 A1      Sep. 20, 2007

Related U.S. Application Data

(63) Continuation-in-part of application No. 10/544,970, filed on Aug. 9, 2005, now abandoned.

(30) Foreign Application Priority Data

May 16, 2005   (KR) ........................ 10-2005-0040627

(51) Int. Cl.
*B29C 55/00*    (2006.01)
*D01D 5/12*     (2006.01)

(52) U.S. Cl. .................................. 264/210.7

(58) Field of Classification Search ................ 264/210.7
See application file for complete search history.

(56) References Cited

U.S. PATENT DOCUMENTS

| | | |
|---|---|---|
| 4,247,498 A | 1/1981 | Castro |
| 4,335,193 A | 6/1982 | Doi et al. |
| 4,539,256 A | 9/1985 | Shipman |
| 4,588,633 A | 5/1986 | Kono et al. |
| 4,873,034 A | 10/1989 | Kono et al. |
| 5,051,183 A | 9/1991 | Takita et al. |
| 5,641,565 A | 6/1997 | Sogo |
| 5,786,396 A | 7/1998 | Takita et al. |
| 5,830,554 A | 11/1998 | Kaimai et al. |
| 5,853,633 A * | 12/1998 | Kono et al. ................. 264/54 |
| 6,153,133 A * | 11/2000 | Kaimai et al. .............. 264/41 |
| 6,566,012 B1 | 5/2003 | Takita et al. |

FOREIGN PATENT DOCUMENTS

| | | |
|---|---|---|
| JP | 6212006 | 8/1994 |
| JP | 6234876 | 8/1994 |
| JP | 93228 | 1/1997 |
| JP | 9259858 | 10/1997 |
| JP | 2000-017100 A | 1/2000 |

* cited by examiner

*Primary Examiner* — Christina Johnson
*Assistant Examiner* — Patrick Butler
(74) *Attorney, Agent, or Firm* — Cantor Colburn LLP

(57) ABSTRACT

The present invention discloses a microporous high-density polyethylene film for a battery separator, and process for preparing the same. The microporous high-density polyethylene film according to the present invention comprises of high-density polyethylene with weight average molecular weight of $2\times10^5 \sim 4\times10^5$, containing not more than 5 wt % of molecules with molecular weight of $1\times10^4$ or less and not more than 5 wt % of molecules with molecular weight of $1\times10^6$ or more, and has the properties of puncture strength of 0.22 N/μm or more, Darcy's permeability constant of $1.8\times10^{-5}$ Darcy or more, and shrinkage of 4% or less in machine and transverse direction, respectively. Particularly, the microporous high-density polyethylene film has excellent extrusion-compoundability and stretchability with high productivity and enhances performances and stability of the battery using the film.

4 Claims, No Drawings

PREPARING METHOD OF MICROPOROUS HIGH DENSITY POLYETHYLENE FILM

CROSS REFERENCE TO RELATED APPLICATIONS

This application is a continuation-in-part application of U.S. application Ser. No. 10/544,970 filed Aug. 9, 2005, which is the U.S. National Stage of application PCT/KR05/01892 having an International Filing Date of Jun. 18, 2005, which claims priority to and the benefit of Korean Patent Application No. 2005-0040627 filed on May 16, 2005, all of which are incorporated by reference herein in their entireties.

FIELD OF THE INVENTION

The present invention relates to a microporous high-density polyethylene film and a process for preparing the same. More particularly, the present invention pertains to a microporous high-density polyethylene film having high productivity as well as superior extrusion-compoundability and stretchability, which can improve performances and stability of a battery produced from the film, and a process for preparing the same.

BACKGROUND OF THE INVENTION

Having chemical stability and superior physical properties, microporous polyolefin film has been widely used as various battery separators, filters and ultrafiltration membranes.

The production of the microporous film by using polyolefin may be conducted according to the following three processes. According to the first process, polyolefin is processed into a thin fiber to produce a non-woven fabric-shaped microporous film. The second process is a dry process wherein a thick polyolefin film is prepared and stretched at low temperature to create micro-cracks between lamellas, the crystalline portion of polyolefin, to form micropores in polyolefin. The third process is a wet process wherein polyolefin is compounded with a diluent at high temperature to form a single phase, which is then subjected to phase separation into polyolefin and the diluent during the course of cooling, and the diluent portion is extracted to form pores in polyolefin. In comparison with the first or second process, the third process, that is a wet process, produces relatively thin microporous film with uniform thickness and excellent physical properties, so that the microporous film according to the wet process is widely used for a separator film of a secondary battery such as a lithium ion battery.

A method of preparing a porous film according to a wet process is disclosed in U.S. Pat. No. 4,247,498, which comprises blending polyethylene and a compatible liquid therewith at a high temperature to form a thermodynamically homogeneous solution, and cooling the solution to initiate solid/liquid or liquid/liquid phase separation, thereby producing a porous polyolefin film.

U.S. Pat. No. 4,335,193 discloses a method of preparing a porous polyolefin film, which comprises processing polyolefin by adding an organic liquid such as dioctylphthalate and liquid paraffin and inorganic filler; and removing the organic liquid compound and inorganic filler. Such a process is also described in U.S. Pat. No. 5,641,565. However, the process is disadvantageous in that it is difficult to feed and compound the inorganic filler because of employing inorganic fillers such as silica, and a subsequent process of extracting and removing the inorganic filler must be additionally conducted, thereby the process becomes complicated and difficult to increase the stretching ratio.

U.S. Pat. No. 4,539,256 also discloses a basic method of producing a microporous film by extruding polyethylene and compatible liquid compound, stretching and extracting the resultant mixture.

In conjunction with practical use of secondary batteries, efforts have been continuously made to improve the productivity and physical properties of a microporous film. A representative example is to improve the strength of the microporous film by using ultra-high molecular weight polyolefin (UHMWPO) with a weight average molecular weight of about 1,000,000, or blending such a UHMWPO to increase the molecular weight of the composition.

In this regard, U.S. Pat. Nos. 4,588,633 and 4,873,034 suggest a process for preparing a microporous film, wherein polyolefin having weight average molecular weight of 500,000 or more and a solvent capable of dissolving the polyolefin at high temperature are subjected to solvent extraction and stretching in two steps. However, this process is disadvantageous in that, in order to improve poor extrudability and compoundability of UHMWPO with the diluent (which are known as disadvantages of UHMWPO), an excessive amount of diluent is used in the extruding process, and the diluent must be extracted through two steps, before and after stretching.

U.S. Pat. No. 5,051,183 introduces a microporous polyolefin film, which includes a composition with polydispersity index (weight average molecular weight/number average molecular weight) of 10~300, containing 10~50 wt % of polyolefin having not less than 1% of UHMWPO with weight average molecular weight of 700,000 or more, and 90~50 wt % of solvent such as mineral oil. In this regard, the composition is extruded to form a gel-like sheet and stretched at a temperature range from the melting point of the composition to a temperature higher than the melting point by 10° C., and the solvent is then extracted from the composition, thereby forming a porous film. However, this process is disadvantageous in that the molecular weight distribution is broadened upon blending with UHMWPO and the composition contains an excessive amount of polyolefin having high molecular weight. In such a case, severe chain entanglement occurs due to those molecules, resulting in significant reduction of stretchability. In other word, breakage occurs at a high stretching ratio and high speed, and non-uniform stretching occurs at a low stretching ratio.

In order to overcome those disadvantages, stretching temperature is increased to make the composition soft during the stretching process, or the stretching speed is reduced to afford the same effect as the raised temperature of the composition. In such a case, however, orientation of a resin becomes poor during the stretching process to lower the stretching effect, thereby deteriorating physical properties of the end porous film. Furthermore, a film made of the resin with broad molecular weight distribution has more defects due to the molecules with relatively low molecular weight, than a film made of the resin with narrow molecular weight distribution, thereby exhibiting reduced impact strength and puncture strength. Likewise, in the microporous film, the broad molecular weight distribution of polyethylene results in poor the puncture strength, which is one of the most important physical properties of the microporous film. In other word, UHMWPO incorporated into the microporous film does not contribute to improving physical properties thereof. Those disadvantages are also found in relevant prior arts, for example, in Japanese Patent Laid-Open Publication Nos. Hei 06-234876 and Hei 06-212006 and U.S. Pat. No. 5,786,396.

Meanwhile, Japanese Patent Laid-Open Publication No. Hei 09-3228 utilizes the similar composition as above, and suggests a method for improving physical properties of a microporous film by balancing stretching ratios in machine direction (MD) and transverse direction (TD).

Japanese Patent Laid-Open Publication No. Hei 09-259858 provides a process for preparing a microporous polyethylene film, which comprises preparing a solution including 10~80 wt % of resin composition which contains 70~99 wt % of polyethylene with weight average molecular weight of 500,000 or more and 1~30 wt % of low molecular weight polyethylene with weight average molecular weight of 1,000~4000, and 20~90 wt % of solvent; extruding through a die and cooling the solution to form a gelated composition; stretching the gelated composition; and extracting the remaining solvent from the stretched composition, so as to reduce a shutdown temperature (at which the microporous film melts to block the pores to shut out electric current, and thus ignition or explosion is prevented when the temperature of a battery increases owing to an abnormal operation of the battery) of the microporous polyethylene film. In this respect, this process is characterized in that low molecular weight polyethylene with weight average molecular weight of 1,000~4,000 is used to reduce the shutdown temperature of the microporous film. However, this process has two problems. First, use of molecules having low molecular weight brings about decrease in the molecular weight and broad molecular weight distribution, thereby deteriorating the physical properties of the microporous polyethylene film. From the examples of the patent, it can be seen that tensile strength of the microporous polyethylene film is relatively low as being 1,000~1,200 $kg/cm^2$. Second, a sophisticated technology is required to compound the polyolefin and diluent or solvent. For the commercial manufacturing, a twin screw extruder, a kneader, a Banbury mixer or the like is employed. In case that resins having significantly different viscosities (ultra-high molecular weight polyethylene with weight average molecular weight of 500,000 or more and low molecular weight polyethylene with weight average molecular weight of 1,000~4,000) are blended with solvent, as described above, there are problems of compounding the resin and solvent, as well as compounding the two resins having different molecular weights (they have significantly different viscosities in molten state). In such a case, fine gels or fish eyes may occur on the end film, thereby deteriorating the quality of the film. To avoid such a phenomenon, there may be provided a method of increasing the residence time of the melt in an extruder, but the method causes disadvantage of decrease in productivity.

U.S. Pat. No. 5,830,554 recites a process for preparing microporous polyolefin film, in which a solution containing 5~50 wt % of resin with weight average molecular weight of 500,000~2,500,000 and a ratio of weight average molecular weight to number average molecular weight of 10 or less, is subjected to extruding, stretching and extracting processes in order to overcome the problems of poor physical properties and low stretchability resulted from the resin of broad molecular weight distribution. According to the method, a large amount (preferably, 80~90 wt %) of solvent is used to avoid the problem of non-uniform extrusion caused by increased viscosity of the resin in the course of extruding the ultra-high molecular weight resin, and thus, the porosity is increased and the tensile strength of the porous film becomes 800 $kg/cm^2$ or more (in examples, 950~1,200 $kg/cm^2$), which means that the physical properties of the porous film are not substantially improved.

Furthermore, U.S. Pat. No. 6,566,012 discloses a process for preparing a microporous film usefully applied to a battery separator, in which 10~40 wt % of ultra-high molecular weight polyolefin with weight average molecular weight of 500,000 or more, or 10~40 wt % of a resin composition containing ultra-high molecular weight polyolefin with weight average molecular weight of 500,000 or more, and 90~60 wt % of solvent are subjected to extruding, molding, stretching, extracting and heat-setting steps.

As described above, the prior arts employ the resin with high molecular weight to improve the physical properties of the porous film, but the increase of molecular weight of the resin may bring about problems such as increased extrusion load, poor extrusion-compoundability of the resin with solvent, increased load of a stretcher during the stretching process, occurrence of non-uniform stretching, and decreased productivity owing to the decrease of stretching speed and ratio.

The present inventors have conducted extensive studies to avoid the above disadvantages resulted from the prior arts, and found that defects of polyethylene can be prevented from being formed and the stretching efficiency can be improved to provide sufficient properties as a separator by controlling the amount of low molecular weight polyethylene molecules and ultra-high molecular weight molecules contained in the polyethylene to a predetermined level or less and controlling the stretching condition, even by using polyethylene of moderate molecular weight without increasing the molecular weight of polyethylene by means of incorporating ultra-high molecular weight polyethylene, and completed the present invention.

Thus, the object of the present invention is to overcome the problems of prior arts involved with increased molecular weight, and provide a microporous high-density polyethylene film having excellent physical properties and uniform pore structure to be usable as a microporous film for a battery.

Another object of the present invention is to provide a process for economically preparing a microporous high-density polyethylene film with high productivity.

SUMMARY OF THE INVENTION

In order to achieve the objects mentioned above, the polyethylene microporous film according to the present invention is prepared from a composition consisting of 20~50 wt % of high-density polyethylene with weight average molecular weight of $2\times10^5$~$4\times10^5$, containing not more than 5 wt % of molecules with molecular weight of $1\times10^4$ or less and not more than 5 wt % of molecules with molecular weight of $1\times10^6$ or more (Component I), and 80~50 wt % of diluent (Component II), through the steps of (a) melt-extruding the composition consisting of 20~50 wt % of Component I and 80~50 wt % of Component II to form a sheet;

(b) stretching the sheet at a temperature range where 30~80 wt % of the crystalline portion of the sheet melts, by using simultaneous stretching with a tenter type stretcher, in a stretching ratio of 4 times or more in machine and transverse direction, respectively, with total stretching ratio of 25~50 times to form a film;

(c) cooling the film, just upon the completion of stretching, under the condition of retaining the tension applied during the stretching;

(d) extracting the diluent from the resultant film; and (e) heat-setting the film at a temperature range where 10~30 wt % of the crystalline portion of the film melts; and the film is characterized by having the puncture strength of 0.22 N/μm or more, gas permeability (Darcy's permeability constant) of $1.8 \times 10^{-5}$ Darcy or more, and shrinkage of 4% or less in machine and transverse direction, respectively.

DETAILED DESCRIPTION

Now, the present invention is described in more detail.

According to the present invention, provided are a microporous high-density polyethylene film with excellent extrusion-compoundability and stretchability, which can be used as a microporous film for a battery by overcoming the problems caused by increase of the molecular weight of the resin, and a process for preparing the same.

The basic principles of preparing polyethylene microporous film from polyethylene are as follows:

A low molecular weight organic substance with a molecular structure similar to that of polyethylene (hereinafter, referred to as "diluent") forms a thermodynamically single phase in conjunction with polyethylene at high temperature where polyethylene melts. When a solution of polyethylene and diluent in the thermodynamically single phase state is cooled to ambient temperature, phase separation between polyethylene and diluent occurs. In detail, the single phase is divided into a polyethylene rich phase essentially consisting of lamellas corresponding to the crystalline portion of the polyethylene, and a diluent rich phase consisting of small amount of polyethylene dissolved in the diluent at ambient temperature and the diluent. After cooling, the diluent is extracted with organic solvent to provide a microporous polyethylene film.

Accordingly, a basic structure of the microporous film depends on the process of phase separation. In other words, the pore size and structure of the end microporous film depend on the size and structure of the diluent rich phase formed through the phase separation. Additionally, the basic physical properties of the microporous film are influenced by the crystalline structure of polyethylene formed during the course of diluent extraction.

The present inventors have conducted intensive studies in this regard for a long time, and found the following facts. That is, in order to prepare a microporous film of excellent properties, there should be as small amount of polyethylene as possible in the diluent rich phase, and defects should not be formed in polyethylene during the course of diluent extraction so as to prepare desirable microporous film; and those phenomena are most largely affected by low molecular weight polyethylene molecules contained in polyethylene.

Based on the above principles, the present inventors produced products by using polyethylene containing a small amount of low molecular weight molecules, and obtained a microporous polyethylene film with excellent physical properties and uniform pore structure with enhanced processability, even by the use of a resin having lower molecular weight than that in the conventional inventions.

Typically, commercially available polyethylene inevitably has a certain molecular weight distribution, and some molecules having molecular weight of several thousands exist in polyethylene even having the weight average molecular weight of more than one million. Since the low molecular weight molecules contribute to improving the processability of a high molecular weight resin in case of applying the polyethylene to a blown film and a blow molding process, that is the commercial application fields where polyethylene is commonly used, the low molecular weight molecules have been intentionally incorporated in the process of producing polyethylene. However, in the course of producing a microporous polyethylene film, the low molecular weight molecules reduce integrity of the lamellas corresponding to the crystalline portion of polyethylene in the polyethylene rich phase and reduce the number of tie molecules interconnecting the lamellas, thereby decreasing the overall strength of polyethylene. Further, since the low molecular weight molecules have a high compatibility to the diluent, they predominantly exist in the diluent rich phase, thus existing at the interface between pores after the extraction, to make the interface unstable to result in decrease of the porosity of microporous polyethylene film. These phenomena are resulted from the molecules having molecular weight of $1 \times 10^4$ or less, and being prominent when the amount is more than 5 wt %.

Another problem involved with the existence of molecular weight distribution is the existence of molecules having ultra-high molecular weight. In the polyethylene having the weight average molecular weight of about $1 \times 10^5$, there are some molecules having the molecular weight of more than $1 \times 10^6$. Though the molecules having ultra-high molecular weight play a role of increasing the strength of a sheet, excess amount of molecules of ultra-high molecular weight induce gelation caused by lowered compoundability with diluent due to significant difference of viscosity from that of diluent, and make the surface shape of the extruded sheet coarse. Since those problems prominently occur when there are not less than 5% of the molecules of ultra-high molecular weight of $1 \times 10^6$ or more, those molecules should preferably be 5% or less in the composition.

The microporous high-density polyethylene film according to the present invention is prepared by melt-extruding a composition consisting of 20~50 wt % of high-density polyethylene with weight average molecular weight of $2 \times 10^5 \sim 4 \times 10^5$, containing not more than 5 wt % of molecules with molecular weight of $1 \times 10^4$ or less and not more than 5 wt % of molecules with molecular weight of $1 \times 10^6$ or more (Component I), and 80~50 wt % of diluent (Component II) to form an article having a sheet shape; stretching it to provide a film; cooling the film, just upon the completion of stretching, under the condition of retaining the tension applied during the stretching; extracting the diluent; and drying and heat-setting the film. In particular, the microporous high-density polyethylene film according to the present invention is characterized by puncture strength of 0.22 N/μm or more, gas permeability (Darcy's permeability constant) of $1.8 \times 10^{-5}$ Darcy or more, and shrinkage of 4% or less in machine and transverse direction, respectively.

Materials conventionally used for preparing microporous polyolefin films include various kinds of polyethylene (low density polyethylene, linear low density polyethylene, medium density polyethylene, high density polyethylene and the like), and polypropylene. However, in case of polyethylene other than high-density polyethylene, and polypropylene, the structural regularity of the polymer is reduced to deteriorate the integrity of lamellas corresponding to the crystalline portion of the resin and to decrease the thickness of the lamella layer. Furthermore, when a comonomer exists in the polymerization reaction, large amount of low molecular weight molecules are produced, since the reactivity of the comonomer being lower than that of ethylene.

Hence, it is preferable that high-density polyethylene contains not more than 2 wt % of comonomer. As the comonomer, alpha olefins such as propylene, butene-1, hexene-1, 4-methylpentene-1, and octene-1 may be used. More suitable are propylene, butene-1 and 4-methylpentene-1, having relatively high reactivity.

Meanwhile, it is desirable to use high-density polyethylene with high molecular weight so as to provide excellent physical properties to the microporous end film, but in case of using high-density polyethylene with high molecular weight, a load of an extruder is increased due to an increase of viscosity during the extruding process; compoundability is reduced owing to the large difference in viscosity between polyethylene and diluent; and surface of an extruded sheet becomes coarse. In order to avoid the disadvantages, extruding temperature may be increased or a screw configuration of a twin screw compounder may be controlled to increase shear rate; but this results in deterioration of resin and reduction of physical properties of the film.

Further, increase of the molecular weight of the resin brings about increased entanglement of molecules to increase the strength of the sheet, thereby increasing a load during the stretching process to cause slippage from a clip that is used for stretching the sheet. Additionally, since the strength of the sheet is increased, non-uniform stretching may occur at a low stretching ratio. However, since the increased stretching ratio serves to increase shrinkage of the microporous film and a load of the clip of a stretcher, it is difficult to largely increase the stretching ratio. To avoid these disadvantages, stretching temperature may be increased to make the sheet soft during the stretching process, or a stretching speed may be reduced to gain similar effect as an increase of the temperature of the composition. In such a case, however, orientation of the resin becomes poor during the stretching process to lower the stretching effect, thereby reducing the physical properties of the end microporous film. Further, decrease of the stretching speed undesirably reduces the productivity of the film.

Another problem occurring in the course of stretching is shrinkage of the film when the stretching process is over and the tension applied at the stretching process is released. The stretched film shrinks due to the residual stress after removal of stretching force until the film is cooled. The shrinkage have two adverse effects on the film properties. One is to lower gas permeability, one of the most important properties as a separator film, because the pores are blocked owing to shrinkage of the film. If a film having low gas permeability is utilized in a battery, it deteriorates the properties of charging/discharging cycle of a battery. Another effect of shrinkage in the course of cooling the film is to reduce actual stretching of a film. Rigidity among the physical properties of a film significantly increases with orientation of polymer molecules resulted from stretching. Thus, reduction of actual stretching ratio decreases orientation of molecules during the stretching to lower physical properties of the film.

The inventors have found that if the film is cooled after stretching, under the condition of retaining the tension applied during the stretching and the stretching ratio, shrinkage after stretching can be reduced to increase the actual stretching ratio, thereby maximizing the stretching effect. Thus, excellent film can be prepared with increased permeability, as well as improved physical properties. Such physical properties can be easily achieved even by using high-density polyethylene with low molecular weight.

In other word, it is found that if the film is cooled under the condition of retaining the tension applied during the stretching and the stretching ratio, the film produced exhibits superior properties in permeability and physical properties, as compared to the film cooled under the condition otherwise. Thus, according to the cooling process described above, sufficient physical properties of a film can be obtained without using high-density polyethylene having the weight average molecular weight of more than $4 \times 10^5$ which may result in increase of extrusion load during the extrusion step, decrease in compoundability with diluent or poor surface quality of the extruded sheet. According to the process, residual stress is lower than the film using high-density polyethylene having the weight average molecular weight of more than $4 \times 10^5$, thereby decreasing the shrinkage of the end product and increasing the gas permeability of the film.

With respect to this, the present inventors found that when using high-density polyethylene comprising sufficiently small proportion of low molecular weight molecules and of ultra-high molecular weight molecules, that is high-density polyethylene containing not more than 5 wt % of molecules with molecular weight of $1 \times 10^4$ or less and not more than 5 wt % of molecules with molecular weight of $1 \times 10^6$ or more, the film produced after cooling under the condition of retaining the tension applied during the stretching and the stretching ratio, has sufficient physical properties to be applied to a battery separator even by using high-density polyethylene having weight average molecular weight of $4 \times 10^5$ or less. In this regard, since high-density polyethylene with the weight average molecular weight less than $2 \times 10^5$ has undesirable physical properties, the high-density polyethylene used in the present invention is selected to have the weight average molecular weight of $2 \times 10^5 \sim 4 \times 10^5$. The high-density polyethylene with the desired molecular weight and molecular weight distribution as described above has excellent stretchability, and thus, the film produced has an excellent pore structure at low stretching ratio, and the load of the clip used in the stretching process is low, so that the stretching process can be easily conducted with improved productivity. In addition, the polyethylene described above is advantageous in that it provides less residual stress as compared to high-density polyethylene having weight average molecular weight of $4 \times 10^5$ or more, to reduce the shrinkage of the end product.

Any organic liquid capable of forming a single phase in conjunction with the resin at the extrusion temperature may be used as a diluent of the present invention. Examples of the diluent include aliphatic or cyclic hydrocarbon such as nonane, decane, decalin and paraffin oil, and phthalic acid ester such as dibutyl phthalate and dioctyl phthalate. Among them, preferable is paraffin oil, which is harmless to human body, has high boiling point, and contains small amount of volatile components. Paraffin oil with kinetic viscosity of 20~200 cSt at 40° C. is more preferably used. When the kinetic viscosity of paraffin oil is higher than 200 cSt, there may occur problems such as increased load and inferior surface of the sheet and film, and since it is difficult to carry out the extraction process, the productivity may be reduced and the permeability may be reduced owing to the residual oil. On the other hand, when the kinetic viscosity of paraffin oil is less than 20 cSt, it is difficult to carry out compounding of paraffin oil with polyethylene melt in the extruder during the extrusion process because of large viscosity difference between paraffin oil and the polyethylene melt.

As for the proportion of high-density polyethylene and diluent, it is preferable that the amounts of high-density polyethylene and diluent are 20~50 wt % and 80~50 wt %, respectively. When the amount of high-density polyethylene is more than 50 wt % (i.e. when the amount of diluent is less than 50 wt %), the porosity and pore size are reduced, and interconnection between pores is reduced, thereby significantly reducing the permeability. On the contrary, when the amount of high-density polyethylene is less than 20 wt % (i.e. when the amount of diluent is more than 80 wt %), the compoundability of polyethylene with diluent is reduced, and thus, polyethylene is not thermodynamically blended with the diluent but extruded in a gel state, bring about problems such as breakage or uneven thickness during the stretching process.

Additives such as an oxidation stabilizer, an UV stabilizer and an antistatic agent may be further added to the composition so as to improve specific functions of the composition.

The composition is melt-extruded by using a twin screw compounder, a kneader or a Banbury mixer, designed to be used to mix polyethylene with diluent, to form a sheet. Polyethylene and diluent may be fed into the compounder after they are previously blended with each other, or may be fed into the compounder through separate feeders. Both casting and calendering processes may be applied to produce the sheet from the melt.

It is preferable that the stretching process is conducted in a roll type or tenter type sequential or simultaneous stretching manner.

At this time, it is preferable that the stretching ratios are 4 times or more in machine and transverse direction, respectively, and the total stretching ratio is 25~50 times. When the stretching ratio is less than 4 times in any direction, orientation is poor in such direction and a balance between the physical properties in the machine and transverse direction is upset, and thus, the tensile strength and puncture strength are reduced. Additionally, when the total stretching ratio is less than 25 times, non-uniform stretching occurs, while breakage may occur during the stretching process and the shrinkage of the end film is undesirably increased when the total stretching ratio is more than 50 times.

In this respect, the stretching temperature depends on the melting point of polyethylene, and concentration and type of the diluent. The optimum stretching temperature is preferably selected from a temperature range where 30~80 wt % of the crystalline portion of polyethylene in the sheet melts. When the stretching temperature is lower than the temperature where 30 wt % of the crystalline portion of polyethylene in the film sheet melts, softness of the film is poor to give enough stretchability of the film, and thus, there is a substantial possibility of breakage during the stretching process, while non-uniform stretching occurs at the same time. On the other hand, when the stretching temperature is higher than the temperature where 80 wt % of the crystalline portion melts, the stretching process is easily conducted and the occurrence of the non-uniform stretching is reduced, but the deviation of thickness occurs due to partial over-stretching, and the physical properties of the film are significantly reduced because the orientation effect of the resin is low. Meanwhile, the amount of melting of the crystalline portion of polyethylene depending on the stretching temperature may be evaluated by differential scanning calorimeter (DSC) analysis of the film.

The film stretched in a simultaneous stretcher of tenter-type as described above, is cooled before the film is released from the clip of the tenter, that is under the condition of retaining the tension and stretching ratio at the time of the stretching process. The cooling temperature should be lower than the crystallization temperature of the stretched film but higher than ambient temperature. If the cooling temperature is higher than the crystallization temperature, there is no effect of cooling. If it is lower than ambient temperature, an additional air cooler is required, with no better effect expected. Cooling time of 5~30 seconds is appropriate. Sufficient cooling effect cannot be expected for less than 5 seconds of cooling time, while the length of the stretcher as per cooling efficiency should be increased if the cooling time exceeds 30 seconds.

The cooled film is extracted with organic solvent and dried. Non-limiting, illustrative examples of organic solvents usable according to the present invention include any solvent capable of extracting the diluent which had been used to extrude the resin, and preferably, methyl ethyl ketone, methylene chloride and hexane, which have high extraction efficiency and are rapidly dried. The extraction may be conducted according to a typical solvent extracting process, such as immersion, solvent spray and ultrasonic process, used alone or as a combination thereof. The amount of the residual diluent should be 1 wt % or less after the extraction step. When the amount of the residual diluent is more than 1 wt %, the physical properties and permeability of the film are deteriorated.

The amount of the residual diluent (extraction efficiency) largely depends on the extraction temperature and time. It is preferable that the extraction temperature is high so as to increase the solubility of the diluent in solvent, but it is preferable to limit the extraction temperature up to 40° C. as considering safety regarding the boiling of the solvent. When the extraction temperature is below the solidifying point of the diluent, the extraction efficiency is significantly decreased, so that the extraction temperature should be higher than the solidifying point of the diluent. The extraction time depends on the film thickness and is preferably 2~4 minutes for preparing a typical microporous film with the thickness of 10~30 μm.

Finally, the dried film is subjected to heat-setting process in order to remove residual stress and to reduce the shrinkage of the end film. According to the heat-setting process, the film is set and then heated to forcibly maintain the original shape of the film, which tends to be shrunken otherwise, to remove the residual stress. It is desirable that the heat-setting temperature is high in order to reduce the shrinkage of the film, but when the heat-setting temperature is too high, a portion of the film is molten to block the micropores, thereby reducing the permeability. The desirable heat-setting temperature is selected from a temperature range where 10~30 wt % of the crystalline portion of the film is molten. When the heat-setting temperature is lower than the temperature where 10 wt % of the crystalline portion of the film is molten, relaxation of polyethylene molecules in the film is poor, so that the efficiency of removing residual stress from the film is trivial, while the temperature is higher than the temperature where 30 wt % of the crystalline portion of the film is molten, the film is partially molten to block the micropores to decrease the permeability.

In this regard, the heat-setting time is relatively short when the heat-setting temperature is high, while relatively long when it is low. Preferably, the heat-setting time is from 20 seconds to 2 minutes in case of utilizing continuous heat-setting device of tenter type. Most preferably, the heat-setting time is 1~2 minutes at a temperature range where 10~15 wt % of the crystalline portion of the film is molten, and 20~60 seconds at a temperature range where 15~30 wt % of the crystalline portion of the film is molten.

The microporous high-density polyethylene film prepared according to the present invention has the physical properties as follows:

(1) The puncture strength is 0.22 N/μm or more.

If a microporous film has insufficient puncture strength (which is defined as the strength of the film against a sharp substance) as being used as a battery separator, the film may be torn due to an abnormal surface condition of electrodes or dendrites formed on the surface of the electrode during the use of the battery, thereby a short-circuit may occur. A commercial battery separator having the break point of 350 g or less is regarded problematic in safety, due to the occurrence of a short-circuit. The film with the puncture strength of not less than 0.22 N/μm according to the present invention has the break point of 350 g or more, when the film of 16 μm of thickness is used among the films generally used in commercial battery separator, so that the film can be safely applied to a variety of use.

(2) The gas permeability (Darcy's permeability constant) is not less than $1.8 \times 10^{-5}$ Darcy.

The higher is the gas permeability, the better. When it is $1.8 \times 10^{-5}$ Darcy or more, the efficiency as a microporous film is greatly enhanced to provide higher ion permeability as well as better charging and discharging characteristics of the applied battery. In other word, the film having the gas permeability of $1.8 \times 10^{-5}$ Darcy or more according to the present invention can provide a battery with excellent charging and discharging characteristics and low temperature properties, as well as prolonged life.

(2) The shrinkages are 4% or less in transverse and machine direction, respectively.

The shrinkage is measured after the film is left at 105° C. for 10 minutes. When the shrinkage is high, the film may be highly shrinkable by the heat generated upon charging or discharging of a battery to deteriorate the safety of the battery. The lower is the shrinkage, the better. Since the film according to the invention, having the shrinkage of 4% or less, prevents the occurrence of a short caused by contact of electrodes owing to the contraction of a separator by the heat generated from the battery itself, it can be safely utilized as a separator for a battery.

In addition to the improved physical properties described above, the microporous high-density polyethylene film of the present invention has excellent extrusion-compoundability and stretchability.

Now the present invention is described in more detail by means of following Examples. The described embodiments are to be considered in all respects only as illustrative and not restrictive.

EXAMPLES

Molecular weight and molecular weight distribution of polyethylene were measured by using high temperature gel permeation chromatography (GPC) manufactured by Polymer Laboratory Inc.

Viscosity of a diluent was measured by using CAV-4 automatic viscometer manufactured by Cannon Instrument Co.

Polyethylene and the diluent were compounded by using a twin screw compounder (φ=30 mm). Extrusion temperature was 160~240° C., and residence time was 3 minutes. A melt extruded using a T-shaped die was formed into a sheet with a thickness of 600~1200 μm using a casting roll, and then stretched. A film with a thickness of 200 μm was additionally produced and the number of gels in the film with an area of 2000 cm$^2$ was counted to determine whether the gels, owing to poor melting or compounding, exist in the film or not. The number of the gels should be not more than 50 per 2000 cm$^2$ to avoid deterioration of the quality of the microporous film.

The sheet was analyzed by using a DSC to evaluate the melting of the crystalline portion with a variation of temperature. Analysis conditions included a sample weight of 5 mg and scanning rate of 10° C./min.

Stretching process of the sheet was conducted in a simultaneous stretching manner using a tenter-type lab stretcher while the stretching ratio, temperature and speed were varied, and the stretching temperature was determined at a temperature range where 30~80 wt % of the crystalline portion of polyethylene in the sheet was molten based on the analysis results of the DSC. Stability of stretching was determined by whether break or slippage from the clip occurs or not after continuous stretching for 30 minutes. In other word, the stretchability is expressed 'good' if the stretching for 30 minutes results in no problem, while it is expressed 'bad' if the continuous stretching for 30 minutes results in one or more break or slippage from the clip.

Cooling of the stretched sheet (film) was performed by using air nozzles deviced inside/outside the stretcher tenter.

The extraction of the diluent was performed by using methylene chloride in an immersion process.

After the film, from which the diluent was extracted, was dried under ambient air, the dried film was set to a frame and then left in a convection oven while varying the temperature and time, thereby completing the heat-setting process.

The tensile strength, puncture strength, gas permeability and shrinkage, which are considered as the most important physical properties of the microporous film, of the resulting film were measured, and the results are described in Table 1.

Measurement of the Physical Properties (1) The tensile strength was measured according to ASTM D882.

(2) The puncture strength was determined by measuring strength of the film when the film was punctured by a pin with a diameter of 0.5 mm moving at a speed of 120 mm/min.

(3) The gas permeability was measured by using a porometer (CFP-1500-AEL manufactured by PMI Co., Ltd.). Conventionally, gas permeability was expressed by a Gurley number, but since an effect of the thickness of the film was not reflected in the Gurley number, it is difficult to gain a relative permeability. To avoid the disadvantage, Darcy's permeability constant was employed in the present invention.

Darcy's permeability constant was calculated by the following Equation 1, and nitrogen was used in the present invention.

$C = (8FTV)/(\pi D^2(P^2-1))$                       Equation 1 wherein, C is Darcy's permeability constant, F is flow rate, T is thickness of a sample, V is viscosity of the gas (0.185 for nitrogen), D is diameter of a sample, and P is pressure.

An average value of Darcy's permeability constants in the range of 100~200 psi was used in the present invention.

(4) The shrinkage was obtained by measuring each shrinkage in both machine and transverse direction after the film was left at 105° C. for 10 minutes, and expressed in a percentage.

Example 1

High-density polyethylene with weight average molecular weight of $3.0 \times 10^5$, containing 4.2 wt % of molecules with molecular weight of not more than $10^4$ and 2.7 wt % of molecules with molecular weight of $10^6$ or more, without containing a comonomer, was used as Component I, and paraffin oil having kinetic viscosity of 95 cSt at 40° C., as Component II. The contents of Components I and II were 30 wt % and 70 wt %, respectively.

Stretching was achieved at a temperature of 115° C. where 30 wt % of the crystalline portion melted, with stretching ratio of 36 times (MD×TD=6×6) and stretching speed of 2.0 m/min. The film was cooled at 90° C. for 10 seconds, with the tension of the stretched film and the stretching ratio retained. A film, from which diluent was extracted, was dried in ambient air and set to a frame to be heat-set at a temperature of 120° C. where 20 wt % of the crystalline portion of the film melted, for 30 seconds. The resultant film was 16±1 μm in thickness.

Example 2

The procedure of Example 1 was repeated except that high-density polyethylene with weight average molecular weight of $4.0 \times 10^5$, containing 3.9 wt % of molecules with molecular weight of not more than $10^4$ and 4.2 wt % of molecules with molecular weight of $10^6$ or more, which had been prepared by using 0.5 wt % of butene-1 as a comonomer, was used as Component I, and the cooling after the stretching was conducted at 90° C. for 15 seconds. The stretching was performed at a temperature of 114.5° C. so that the proportion of the crystalline portion being molten was adjusted to 30 wt %, as in Example 1.

Example 3

High-density polyethylene with weight average molecular weight of $4.0 \times 10^5$, containing 3.9 wt % of molecules with molecular weight of not more than $10^4$ and 4.2 wt % of molecules with molecular weight of $10^6$ or more, which had been prepared by using 0.5 wt % of butene-1 as a comonomer, was used as Component I, and paraffin oil having kinetic viscosity of 95 cSt at 40° C., as Component II. The contents of Components I and II were 20 wt % and 80 wt %, respectively.

Stretching was achieved at a temperature of 117° C. where 60 wt % of the crystalline portion melted, with stretching ratio of 49 times (MD×TD=7×7) and stretching speed of 2.0 m/min. After being stretched, the film was cooled at 80° C. for 15 seconds. The heat-setting was performed at a temperature of 117° C. so that the proportion of the crystalline portion being molten was adjusted to 10 wt %, over the period of 80 seconds.

Example 4

High-density polyethylene with weight average molecular weight of $3.5 \times 10^5$, containing 4.5 wt % of molecules with molecular weight of not more than $10^4$ and 3 wt % of molecules with molecular weight of $10^6$ or more, which had been prepared by using 1.5 wt % of butene-1 as a comonomer, was used as Component I, and paraffin oil having kinetic viscosity of 160 cSt at 40° C., as Component II. The contents of Components I and II were 30 wt % and 70 wt %, respectively.

Stretching was achieved at a temperature of 120° C. where 80 wt % of the crystalline portion melted, with stretching ratio of 25 times (MD×TD=5×5) and stretching speed of 2.0 m/min. After being stretched, the film was cooled at 100° C. for 10 seconds. The heat-setting was performed at a temperature of 119° C. where 20 wt % of the crystalline portion melted, over the period of 20 seconds.

Example 5

Same high-density polyethylene as in Example 4 was used as Component I, and paraffin oil having kinetic viscosity of 30 cSt at 40° C., as Component II. The contents of Components I and II were 50 wt % and 50 wt %, respectively.

Stretching was achieved at a temperature of 122° C. where 50 wt % of the crystalline portion melted, with stretching ratio of 35 times (MD×TD=7×5) and stretching speed of 2.0 m/min. After being stretched, the film was cooled at 60° C. for 10 seconds. The heat-setting was performed at a temperature of 122° C. where 30 wt % of the crystalline portion melted, over the period of 20 seconds.

Comparative Example 1

The procedure of Example 1 was repeated except that high-density polyethylene with weight average molecular weight of $1.8 \times 10^5$, having 22.0 wt % of molecules with molecular weight of not more than $10^4$, which had been prepared by using 0.5 wt % of butene-1 as a comonomer, was used as Component I, and the film was not cooled after stretching. The stretching was performed at a temperature of 114.5° C. so that the proportion of the crystalline portion being molten was adjusted to 30 wt %, as in Example 1. Similarly, the heat-setting was performed at a temperature of 119° C. so that the proportion of the crystalline portion being molten was adjusted to 20 wt %, as in Example 1.

Comparative Example 2

The procedure of Example 1 was repeated except that high-density polyethylene with weight average molecular weight of $5.7 \times 10^5$, having 9.0 wt % of molecules with molecular weight of not more than $10^4$, which had been prepared by using 0.8 wt % of butene-1 as a comonomer, was used as Component I, and the film was not cooled after stretching. The stretching was performed at a temperature of 114.5° C. so that the proportion of the crystalline portion being molten was adjusted to 30 wt %, as in Example 1. Similarly, the heat-setting was performed at a temperature of 119° C. so that the proportion of the crystalline portion being molten was adjusted to 20 wt %, as in Example 1.

Comparative Example 3

The procedure of Example 1 was repeated except that high-density polyethylene with weight average molecular weight of $4.0 \times 10^5$, having 3.9 wt % of molecules with molecular weight of not more than $10^4$, which had been prepared by using 0.5 wt % of butene-1 as a comonomer, was used as Component I, and paraffin oil having kinetic viscosity of 95 cSt at 40° C., as Component II, and the contents of Components I and II were 60 wt % and 40 wt %, respectively.

The stretching was performed at a temperature of 120° C. so that the proportion of the crystalline portion being molten was adjusted to 30 wt %, as in Example 1. Similarly, the heat-setting was performed at a temperature of 120° C. so that the proportion of the crystalline portion being molten was adjusted to 20 wt %, as in Example 1.

Comparative Example 4

The procedure of Example 1 was repeated except that high-density polyethylene with weight average molecular weight of $4.0 \times 10^5$, having 3.9 wt % of molecules with molecular weight of not more than $10^4$, which had been prepared by using 0.5 wt % of butene-1 as a comonomer, was used as Component I, and paraffin oil having kinetic viscosity of 95 cSt at 40° C., as Component II, and the contents of Components I and II were 13 wt % and 87 wt %, respectively.

The stretching was performed at a temperature of 112° C. so that the proportion of the crystalline portion being molten was adjusted to 30 wt %, as in Example 1. Similarly, the heat-setting was performed at a temperature of 120° C. so that the proportion of the crystalline portion being molten was adjusted to 20 wt %, as in Example 1.

Comparative Example 5

High-density polyethylene with weight average molecular weight of $4.7 \times 10^5$, having 1.2 wt % of molecules with molecular weight of not more than $10^4$, without containing a comonomer, was used as Component I, and paraffin oil having kinetic viscosity of 30 cSt at 40° C., as Component II, and the contents of Components I and II were 20 wt % and 80 wt %, respectively.

Stretching was achieved at a temperature of 113° C. where 30 wt % of the crystalline portion melted, with stretching ratio of 49 times (MD×TD=7×7) and stretching speed of 2.0 m/min. After being stretched, the film was cooled at 90° C. for 10 seconds. The heat-setting was performed at a temperature of 120° C. where 20 wt % of the crystalline portion melted, over the period of 20 seconds.

Comparative Example 6

The procedure of Example 1 was repeated except that high-density polyethylene with weight average molecular weight of $3.5 \times 10^5$, having 4.5 wt % of molecules with molecular weight of not more than $10^4$, which had been prepared by using 1.5 wt % of butene-1 as a comonomer, was used as Component I, and stretching was performed at a temperature of 109° C. where 5 wt % of the crystalline portion of polyethylene melted. Similarly, the heat-setting was performed at a temperature of 119° C. so that the proportion of the crystalline portion being molten was adjusted to 20 wt %, as in Example 1.

Comparative Example 7

The procedure of Example 1 was repeated except that high-density polyethylene with weight average molecular weight of $3.5 \times 10^5$, having 4.5 wt % of molecules with molecular weight of not more than $10^4$, which had been prepared by using 1.5 wt % of butene-1 as a comonomer, was used as Component I, and stretching was performed at a temperature of 121° C. where 85 wt % of the crystalline portion of polyethylene melted. Similarly, the heat-setting was performed at a temperature of 119° C. so that the proportion of the crystalline portion being molten was adjusted to 20 wt %, as in Example 1.

Comparative Example 8

The procedure of Example 1 was repeated except that high-density polyethylene with weight average molecular weight of $3.5 \times 10^5$, having 4.5 wt % of molecules with molecular weight of not more than $10^4$, which had been prepared by using 1.5 wt % of butene-1 as a comonomer, was used as Component I, and stretching was performed at a temperature of 117° C. where 40 wt % of the crystalline portion of polyethylene melted, and heat-setting was performed at a temperature of 127° C. where 35 wt % of the crystalline portion of polyethylene melted.

Comparative Example 9

The procedure of Example 1 was repeated except that high-density polyethylene with weight average molecular weight of $3.5 \times 10^5$, having 4.5 wt % of molecules with molecular weight of not more than $10^4$, which had been prepared by using 1.5 wt % of butene-1 as a comonomer, was used as Component I, and stretching was performed at a temperature of 115° C. where 30 wt % of the crystalline portion of polyethylene melted, and the stretching ratio was 16 times (MD×TD=~4×4).

Comparative Example 10

As Component I, used was a powdery mixture of 25 wt % of ultra-high molecular polyethylene with weight average molecular weight of $8.8 \times 10^5$, and 75 wt % of polyethylene with weight average molecular weight of $1.8 \times 10^5$. The content of molecules having molecular weight of not more than $10^4$ in the Component I (mixture) was 9.4 wt %, and 0.4 wt % of butene-1 had been used as a comonomer. Paraffin oil having kinetic viscosity of 95 cSt at 40° C. was used as Component II, and the contents of Components I and II were 30 wt % and 70 wt %, respectively.

Stretching was achieved at a temperature of 115° C. where 30 wt % of the crystalline portion melted, with stretching ratio of 56 times (MD×TD=7.5×7.5) and stretching speed of 2.0 m/min. After being stretched, the film was cooled at 90° C. for 10 seconds. The heat-setting was performed at a temperature of 120° C. where 20 wt % of the crystalline portion melted, over the period of 30 seconds.

Comparative Example 11

The procedure of Example 1 was repeated except that cooling step was performed under the same condition but without retaining the tension nor stretching ratio of the stretching process.

The experimental condition of Examples and Comparative Examples described above, and the results obtained therefrom are summarized in Table 1 to 3 below:

TABLE 1

| Manufacturing condition | | Unit | Examples | | | | |
|---|---|---|---|---|---|---|---|
| | | | 1 | 2 | 3 | 4 | 5 |
| High-density | Mw | g/mol | $3.0 \times 10^5$ | $4.0 \times 10^5$ | $4.0 \times 10^5$ | $3.5 \times 10^5$ | $3.5 \times 10^5$ |
| polyethylene | Mw $<10^4$ | wt % | 4.2 | 3.9 | 3.9 | 4.5 | 4.5 |
| (Component I) | Mw $>10^6$ | wt % | 2.7 | 4.2 | 4.2 | 3.0 | 3.0 |
| | Comonomer | wt % | 0.0 | 0.5 | 0.5 | 1.5 | 1.5 |
| | Content | wt % | 30 | 30 | 20 | 30 | 50 |
| Paraffin Oil | Viscosity (40° C.) | cSt | 95 | 95 | 95 | 160 | 30 |
| (Component II) | Content | wt % | 70 | 70 | 80 | 70 | 50 |
| Stretching | Temperature | ° C. | 115 | 114.5 | 119 | 118 | 122 |
| | Molten crystal | wt % | 30 | 30 | 60 | 20 | 50 |
| | Ratio (MD × TD) | ratio | 6 × 6 | 6 × 6 | 7 × 7 | 5 × 5 | 7 × 5 |
| | Speed | m/min | 2.0 | 2.0 | 2.0 | 2.0 | 2.0 |
| Cooling | Temperature | ° C. | 90 | 90 | 80 | 100 | 60 |
| | Time | Sec | 10 | 15 | 15 | 10 | 10 |
| Heat-setting | Temperature | ° C. | 120 | 120 | 117 | 118 | 122 |
| | Molten crystal | wt % | 20 | 20 | 10 | 20 | 30 |
| | Time | sec | 30 | 30 | 80 | 20 | 20 |
| Number of gels in sheet | | #/2000 cm² | 5 | 15 | 17 | 15 | 6 |
| Stretchability | | — | good | good | good | good | good |
| Film thickness | | μm | 16 | 16 | 16 | 16 | 17 |

TABLE 1-continued

|  |  |  | Examples | | | | |
| --- | --- | --- | --- | --- | --- | --- | --- |
| Manufacturing condition | | Unit | 1 | 2 | 3 | 4 | 5 |
| Puncture Strength | | N/μm | 0.23 | 0.25 | 0.22 | 0.22 | 0.24 |
| Air Permeability | | Darcy (×10$^{-5}$) | 1.9 | 1.9 | 2.1 | 2.0 | 1.8 |
| Shrinkage | MD | % | 3.5 | 3.5 | 4.0 | 3.5 | 3.2 |
|  | TD |  | 1.5 | 1.8 | 2.0 | 1.8 | 0.7 |

TABLE 2

|  |  |  | Comparative Examples | | | | |
| --- | --- | --- | --- | --- | --- | --- | --- |
| Manufacturing condition | | Unit | 1 | 2 | 3 | 4 | 5 |
| High-density Polyethylene (Component I) | Mw | g/mol | 1.8 × 10$^5$ | 5.7 × 10$^5$ | 4.0 × 10$^5$ | 4.0 × 10$^5$ | 4.7 × 10$^5$ |
|  | Mw <10$^4$ | wt % | 22.0 | 9.0 | 3.9 | 3.9 | 1.2 |
|  | Mw >10$^6$ | wt % | 1.5 | 5.4 | 4.2 | 4.2 | 4.5 |
|  | Comonomer | wt % | 0.5 | 0.8 | 0.5 | 0.5 | 0.0 |
|  | Content | wt % | 30 | 30 | 60 | 13 | 20 |
| Paraffin oil (Component II) | Viscosity (40° C.) | cSt | 95 | 95 | 95 | 95 | 30 |
|  | Content | wt % | 70 | 70 | 40 | 87 | 80 |
| Stretching | Temperature | ° C. | 114.5 | 114.5 | 120 | 112 | 113 |
|  | Molten crystal | wt % | 30 | 30 | 30 | 30 | 30 |
|  | Ratio (MD × TD) | ratio | 6 × 6 | 6 × 6 | 6 × 6 | 6 × 6 | 7 × 7 |
|  | Speed | m/min | 2.0 | 2.0 | 2.0 | 2.0 | 2.0 |
| Cooling | Temperature | ° C. | — | — | 90 | 90 | 90 |
|  | Time | Sec | — | — | 10 | 10 | 10 |
| Heat-setting | Temperature | ° C. | 119 | 119 | 120 | 120 | 120 |
|  | Molten crystal | wt % | 20 | 20 | 20 | 20 | 20 |
|  | Time | sec | 30 | 30 | 30 | 30 | 20 |
| Number of gels in sheet | | #/2000 cm$^2$ | 15 | 75 | 15 | 150 | 25 |
| Stretchability | | — | Good | Bad | Bad | Good | Good |
| Film thickness | | μm | 16 | 17 | 16 | 16 | 15 |
| Puncture Strength | | N/μm | 0.15 | 0.27 | 0.27 | 0.13 | 0.27 |
| Air Permeability | | Darcy (×10$^{-5}$) | 0.8 | 0.8 | 0.2 | 2.4 | 1.9 |
| Shrinkage | MD | % | 3.5 | 4.7 | 7.5 | 3.9 | 4.8 |
|  | TD |  | 2.5 | 3.3 | 5.7 | 2.5 | 3.9 |

TABLE 3

|  |  |  | Comparative Examples | | | | | |
| --- | --- | --- | --- | --- | --- | --- | --- | --- |
| Manufacturing condition | | Unit | 6 | 7 | 8 | 9 | 10 | 11 |
| High-density Polyethylene (Component I) | Mw | g/mol | 3.5 × 10$^5$ | 3.5 × 10$^5$ | 3.5 × 10$^5$ | 3.5 × 10$^5$ | 8.8 × 10$^5$ (25%) 1.8 × 10$^5$ (75%) | 3.0 × 10$^5$ |
|  | Mw <10$^4$ | wt % | 4.5 | 4.5 | 4.5 | 4.5 | 9.4 | 4.2 |
|  | Mw >10$^6$ | wt % | 3.0 | 3.0 | 3.0 | 3.0 | 10.5 | 2.7 |
|  | Comonomer | wt % | 1.5 | 1.5 | 1.5 | 1.5 | 0.4 | 0.0 |
|  | Content | wt % | 30 | 30 | 30 | 30 | 30 | 30 |
| Paraffin oil (Component II) | Viscosity (40° C.) | cSt | 95 | 95 | 95 | 95 | 95 | 95 |
|  | Content | wt % | 70 | 70 | 70 | 70 | 70 | 70 |
| Stretching | Temperature | ° C. | 109 | 121 | 117 | 115 | 115 | 115 |
|  | Molten crystal | wt % | 5 | 85 | 40 | 30 | 30 | 30 |
|  | Ratio (MD × TD) | ratio | 6 × 6 | 6 × 6 | 6 × 6 | 4 × 4 | 7.5 × 7.5 | 6 × 6 |
|  | Speed | m/min | 2.0 | 2.0 | 2.0 | 2.0 | 2.0 | 2.0 |
| Cooling | Temperature | ° C. | 90 | 90 | 90 | 90 | 90 | 90 |
|  | Time | Sec | 10 | 10 | 10 | 10 | 10 | 10 |
| Heat-setting | Temperature | ° C. | 119 | 119 | 127 | 119 | 120 | 120 |
|  | Molten crystal | wt % | 20 | 20 | 35 | 20 | 20 | 20 |
|  | Time | sec | 30 | 30 | 20 | 30 | 30 | 30 |
| Number of gels in sheet | | #/2000 cm$^2$ | 15 | 15 | 15 | 15 | 50 | 5 |
| Stretchability | | — | Bad | Bad | Good | Good | Bad | Good |
| Film thickness | | μm | 16 | 17 | 16 | 16 | 16 | 16 |
| Puncture Strength | | N/μm | 0.25 | 0.1 | 0.25 | 0.13 | 0.27 | 0.22 |
| Air Permeability | | Darcy (×10$^{-5}$) | 0.4 | 2.9 | 0.2 | 1.9 | 1.6 | 1.6 |
| Shrinkage | MD | % | 7.5 | 2.0 | 1.5 | 2.6 | 8.2 | 3.1 |
|  | TD |  | 6.5 | 0.6 | 0.7 | 1.8 | 4.5 | 1.3 |

As can be seen from Table 1~3, the present invention is advantageous in that extrusion and stretching processes of high-density polyethylene are easily conducted, thereby it is possible to stably produce a microporous high-density polyethylene film of the present invention with enhanced productivity, and that since the microporous film has excellent gas permeability, tensile strength and puncture strength with low shrinkage, it can be usefully applied to a battery separator and various filters.

Simple modifications and variations of the present invention fall under the scope of the invention, and the specific scope of the invention is clarified by the claims appended.

We claim:

1. A process for preparing microporous high-density polyethylene having puncture strength of 0.22 N/μm or more, Darcy's permeability constant of $1.8 \times 10^{-5}$ Darcy or more, and shrinkage of 4% or less in machine and transverse direction, respectively, which comprises the steps of melt-extruding a composition consisting of 20 to 50 wt % of high-density polyethylene with weight average molecular weight of $2 \times 10^5$ to $4 \times 10^5$, containing not more than 5 wt % of molecules with molecular weight of $1 \times 10^4$ or less and not more than 5 wt % of molecules with molecular weight of $1 \times 10^6$ or more (Component I), and 80 to 50 wt % of diluent (Component II) to form a sheet;

stretching the sheet at a temperature range where 30 to 80 wt % of the crystalline portion of the sheet melts, by using roll type or tenter type sequential or simultaneous stretcher in a stretching ratio of 4 times or more in machine and transverse direction, respectively, with total stretching ratio of 25 to 50 times to form a film;

cooling the film, just upon the completion of stretching, under the condition of retaining the tension applied during the stretching, wherein a cooling temperature is higher than ambient temperature but lower than a crystallization temperature of the stretched film;

extracting the diluent from the resultant film; and heat-setting the film at a temperature range where 10 to 30 wt % of the crystalline portion of the film melts.

2. A process for preparing microporous high-density polyethylene according to claim 1, wherein Component I comprises not more than 2 wt % of comonomer which is selected from the group consisting of propylene, butene-1, hexene-1 and 4-methylpentene-1.

3. A process for preparing microporous high-density polyethylene according to claim 1, wherein Component II is paraffin oil having kinetic viscosity of 20 to 200 cSt at 40° C.

4. A process for preparing microporous high-density polyethylene according to claim 1, wherein the residual amount of diluent in the film at the extraction step is not more than 1 wt %.

* * * * *